United States Patent [19]

Pomplun et al.

[11] 4,440,898

[45] Apr. 3, 1984

[54] CREPING ADHESIVES CONTAINING ETHYLENE OXIDE/PROPYLENE OXIDE COPOLYMERS

[75] Inventors: William S. Pomplun, Winnebago County; Herbert E. Grube, Outagamie County, both of Wis.

[73] Assignee: Kimberly-Clark Corporation, Neenah, Wis.

[21] Appl. No.: 389,192

[22] Filed: Jun. 17, 1982

[51] Int. Cl.³ .................... C08L 29/04; C08L 39/06; C08L 71/02
[52] U.S. Cl. .................... 524/503; 524/501; 524/500; 525/56; 525/187; 162/112

[58] Field of Search .................... 525/55, 56, 187; 524/501, 503, 500; 162/112

[56] References Cited

U.S. PATENT DOCUMENTS

| | | | |
|---|---|---|---|
| 4,063,995 | 12/1977 | Grossman | 162/112 |
| 4,128,518 | 12/1978 | Oyamoda et al. | 524/501 |
| 4,258,163 | 3/1981 | Mariasi et al. | 525/56 |

*Primary Examiner*—Allan Lieberman
*Attorney, Agent, or Firm*—Gregory E. Croft; R. Jonathan Peters; P. A. Leipold

[57] ABSTRACT

A creping adhesive comprises an admixture of an ethylene oxide/propylene oxide copolymer and a high molecular weight thermoplastic polymer.

4 Claims, No Drawings

CREPING ADHESIVES CONTAINING ETHYLENE OXIDE/PROPYLENE OXIDE COPOLYMERS

FIELD OF THE INVENTION

This invention relates to adhesive compositions and, more particularly, to adhesive compositions useful for creping paper webs which have been substantially dried prior to contact with the creping cylinder.

BACKGROUND OF THE INVENTION

In the production of certain paper products such as facial tissues, paper towels, napkins, and the like, an aqueous slurry of wood fibers (pulp) is deposited on a moving foraminous fabric in such a manner so as to form a thin layer or web of fibers. The resulting web is then dewatered, dried, creped, and wound up on large rolls.

Creping of the web is a well known method for improving the properties of softness and bulk by breaking interfiber bonds. This is commonly accomplished by adhering the web to the surface of a large, rotating drum (Yankee dryer) and thereafter dislodging the web with a doctor blade. As the web contacts the edge of the doctor blade, it experiences compressive forces which disrupt the internal structure and cause the web to buckle, forming a series of peaks and valleys in the web as it leaves the doctor blade. The creping process with the attendant use of creping adhesives is well known in the industry and is adequately described in U.S. Pat. No. 4,304,635 issued Dec. 8, 1981 to H. E. Grube and T. D. Ries, which is hereby incorporated by reference.

More recently, drying of the web by a method known as throughdrying has received considerable attention because of its contribution to improved bulk and softness of the web during drying. This is generally accomplished by passing hot air through the web to effect partial drying prior to pressing the web against the Yankee dryer to finish the drying process. However, one disadvantage of partial drying prior to the Yankee is that the resulting partially dried web requires the addition of a creping adhesive to the surface of the Yankee (or any other creping cylinder which may be used) in order to provide sufficient adhesion of the web to the cylinder necessary to obtain proper creping. This was generally not necessary in more conventional processes where the high moisture content of the web provided sufficient adhesion to the Yankee cylinder. Although creping adhesives may have been used previously from time to time to supplement the natural adhesion of the wet web, the need for creping adhesives has been greatly increased with the advent of throughdrying.

A creping adhesive commonly used for throughdrying processes consists of a blend of ethylene/vinyl acetate copolymer and polyvinyl alcohol. This composition is satisfactory for a wide range of applications, but suffers from buildup of water insoluble residues on process fabrics. The disclosed adhesive comprising ethylene oxide/propylene oxide copolymer and polyvinyl alcohol provides good web bonding properties to the surface of the Yankee dryer while allowing easy cleanup of residues on process fabrics by virtue of the adhesive's water solubility.

SUMMARY OF THE INVENTION

In one aspect, the invention resides in a creping adhesive for use in a throughdrying process for the manufacture of creped wadding, said creping adhesive comprising an admixture of ethylene oxide/propylene oxide copolymer and a high molecular weight thermoplastic polymer having sufficient strength to form an adhesive film. These creping adhesives can be applied to the creping cylinder or the web itself either by printing or spraying with proper adjustment of the viscosity and solids content of the adhesive. Advantageously, the creping adhesives of this invention provide a protective coating to the surface of the creping cylinder and prolong the effective life of the doctor blade. Most importantly, however, they are water soluble and are more easily removed from the process fabrics on which creping adhesives tend to accumulate.

The high molecular weight thermoplastic polymer component can be any thermoplastic polymer available in water-dispersed or water-solution form having a molecular weight of from about 6,000 to about 100,000. Any such polymers will inherently have sufficient strength to form an adhesive film for purposes of this invention. Particularly suitable thermoplastic polymers include polyvinyl alcohol, ethylene/vinyl acetate copolymer, and polyvinyl pyrrolidone.

On a weight basis, the relative amount of ethylene oxide moieties in the ethylene oxide/propylene oxide copolymer can be from about 10 percent to about 80 percent depending upon the specific creping adhesive properties desired and the thermoplastic polymer with which the copolymer is blended. Similarly, the relative amounts of the ethylene oxide/propylene oxide copolymer and the thermoplastic polymer will also vary depending upon the degree of adhesion required for the particular application. In general, the amount of the ethylene oxide/propylene oxide copolymer can be from about 5 to about 60 dry weight percent of the adhesive composition. For example, when used in admixture with polyvinyl alcohol, the amount of ethylene oxide/propylene oxide copolymer can be from about 40 to about 60 dry weight percent of the adhesive composition. When used in admixture with ethylene/vinyl acetate copolymer, the amount of ethylene oxide/propylene oxide copolymer can be from about 5 to about 60 dry weight percent of the adhesive composition. Because the ethylene oxide/propylene oxide copolymer acts as a modifier for the thermoplastic film-former, the relative amounts of each necessarily varies with the particular thermoplastic polymer chosen. Nevertheless, the ethylene oxide/propylene oxide copolymer in each case serves to improve water solubility, which is necessary to improve the cleanability of the fabrics used in the papermaking process that are continuously exposed to build-up of creping adhesives. For purposes herein, fabric cleanability represents the ability to remove adhesive residues from process fabrics with water, steam, and/or mechanical cleaning techniques without shutting down the creped wadding process and removing process fabrics.

The invention will be described in more detail by the following examples:

EXAMPLES

EXAMPLE 1

Preparation of Creping Adhesives Containing Ethylene Oxide/Propylene Oxide Copolymer In preparing a creping adhesive in accordance with this invention, two aqueous solutions were first prepared which contain the ethylene oxide/propylene oxide copolymer and the thermoplastic film-former, respectively. The first solution was prepared by dissolving 40 weight percent of an ethylene oxide/propylene oxide copolymer[1] in a hot, stirred water bath. The temperature of the bath was maintained at about 180°–185° F. The second solution was prepared by dissolving 40 weight percent of a polyvinyl alcohol[2] in a hot, stirred water bath at about the same temperature.

[1] Pluronic 127 manufactured by BASF Wyandotte
[2] Gelvatol 40-20 manufactured by Monsanto Chemical Co.

The two solutions were combined by adding 40 parts of the first solution (copolymer) to 60 parts of the second solution (polyvinyl alcohol) with stirring.

In addition, 0.2 weight percent each of a protective colloid[3], an antifoaming agent[4], and an antimicrobial agent[5] can be added to improve the storage stability and application of the adhesive. These additives are conventional for their intended purposes and are not necessary to achieve the improved fabric cleanability exhibited by the creping adhesives of this invention.

[3] Witconal 1206 manufactured by Witco Chemical Co.
[4] Colloid 513 manufactured by Colloid, Inc.
[5] Metasol TK100 manufactured by Merck Chemical Co.

EXAMPLE 2

Fabric Cleanability Test

A 20 weight percent solids solution of the creping adhesive to be tested was applied to a tared 2×4 inch piece of conventional polyester transfer fabric using a one inch paint brush. The adhesive was allowed to air-dry on the fabric, which was then placed in a 250° F. oven overnight. The dried adhesive-treated fabric was reweighed to determine dry adhesive add-on to the fabric.

The adhesive-treated fabric was placed into an agitated 180°–185° F. tap water bath for one hour to wash the fabric. The washed fabric was then removed, rinsed with hot tap water, and placed in a 200° F. oven for one hour. After drying, the fabric was reweighed to determine the weight loss due to washing. Based on this data, the percentage of adhesive washed off the fabric was calculated (Fabric Cleanability). This test was run in triplicate for each adhesive sample.

The creping adhesive described in Example 1 was tested in the above-described procedure and compared to a standard adhesive commonly used in the papermaking industry, namely a 70/30 blend of ethylene/vinyl acetate copolymer and polyvinyl alcohol. The results are summarized in tabular form below:

| ADHESIVE | FABRIC CLEANABIILTY |
| --- | --- |
| Standard | 47% |
| Sample 1 | 100% |

The results clearly indicate the improvement in fabric cleanability obtained when using a creping adhesive comprising an ethylene oxide/propylene oxide copolymer as compared to using a conventional creping adhesive.

It will be appreciated that these examples, shown for purposes of illustration, are not to be construed as limiting the scope of this invention, which is defined by the following claims:

We claim:

1. A creping adhesive for use in a throughdrying process for the manufacture of creped wadding, said creping adhesive consisting essentially of an aqueous admixture of ethylene oxide/propylene oxide copolymer and a water soluble or water dispersible high molecular weight thermoplastic polymer selected from the group consisting of polyvinyl alcohol and polyvinyl pyrrolidone and having sufficient strength to form an adhesive film, wherein the relative amount of ethylene oxide moieties in the ethylene oxide/propylene oxide copolymer is from about 10 to 80 weight percent based on the combined dry weights of the ethylene oxide/propylene oxide copolymer and the thermoplastic polymer and wherein the amount of the ethylene oxide/propylene oxide copolymer is from about 40 to about 60 dry weight percent of the adhesive composition.

2. The creping adhesive of claim 1 wherein the thermoplastic polymer is polyvinyl alcohol.

3. The creping adhesive of claim 2 consisting essentially of from about 40 to about 60 weight percent polyvinyl alcohol and from about 40 to about 60 weight percent ethylene oxide/propylene oxide copolymer.

4. The creping adhesive of claim 1 wherein the thermoplastic polymer is polyvinyl pyrrolidone.

* * * * *